3,639,611
INSECTICIDAL COMPOSITIONS AND METHODS OF COMBATTING INSECTS USING CARBAMOYLOXIMES

Ian Trevor Kay, Brancknell, England, assignor to Imperial Chemical Industries Limited, London, England
No Drawing. Filed Nov. 7, 1968, Ser. No. 774,198
Claims priority, application Great Britain, Nov. 21, 1967, 52,950/67
Int. Cl. A01n 9/00, 9/12
U.S. Cl. 424—275                12 Claims

ABSTRACT OF THE DISCLOSURE

There are provided pesticidally active carbamoyloximes which are applicable to a broad range of pests and may be applied from compositions to the soil, locus of plants and locus of seeds which are to be protected from the pests. An example of the present oxime is isopropyl-5-methylthio-2-thienylketone O-(dimethylcarbamoyl) oxime.

---

This invention relates to new organic compounds and compositions containing them. More particularly the invention relates to new carbamoyloximes and to biologically active compositions containing them.

According to the present invention we provide new compounds having the general formula:

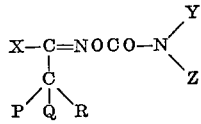

wherein X represents a heterocyclic group having carbon and sulphur ring atoms and P, Q, R, Y and Z represent hydrogen atoms or hydrocarbon groups Preferred compounds are those wherein X represents an unsubstituted or substituted thiophene ring or P, Q, R, Y and Z represent hydrogen atoms or alkyl groups.

The invention includes, especially, compounds of the general formula:

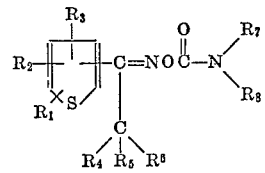

wherein $R_1$, $R_2$ and $R_3$ represent hydrogen, lower alkyl, alkylthio, alkenylthio, alkynylthio or alkylsulphonyl;
$R_4$, $R_5$, $R_6$, $R_7$, and $R_8$ represent hydrogen or lower alkyl, and the oxime-containing moiety is attached to the carbon atom occupying the 2-, or 3-position of the thiophene ring.

Preferably the oxime-containing moiety is attached to the carbon atom occupying the 2-position of the thiophene ring.

The invention particularly includes the compounds set out in Table I below. These are represented by the general formula:

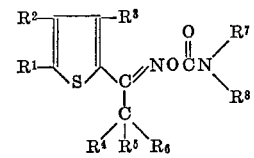

TABLE I

| Compound Number | $R^1$ | $R^2$ | $R^3$ | $R^4$ | $R^5$ | $R^6$ | $R^7$ | $R^8$ | Method of preparation, Example No. | Melting point, °centigrade | Solvent used for crystallisation |
|---|---|---|---|---|---|---|---|---|---|---|---|
| 1 | H | H | H | H | H | H | $CH_3$ | $CH_3$ | 1 | 105–105 | Benzene-light petroleum. |
| 2 | H | H | H | H | H | H | H | $CH_3$ | 2 | 85–86 | Do. |
| 3 | H | H | H | $CH_3$ | H | $CH_3$ | H | $CH_3$ | 4 | 78 | Do. |
| 4 | H | H | H | $CH_3$ | $CH_3$ | $CH_3$ | H | $CH_3$ | 2 | 98–99 | Do. |
| 5 | H | H | H | H | H | $CH_3$ | H | $CH_3$ | 2 | 70–73 | Light petroleum |
| 6 | H | H | H | H | H | $CH(CH_3)CH_3$ | H | $CH_3$ | 2 | 91 | Benzene-light petroleum. |
| 7 | $CH_3CH_2CH_2$ | H | H | $CH_3$ | H | $CH_3$ | H | $CH_3$ | 2 | 92 | Light petroleum. |
| 8 | $CH_3(CH_3)CHCH_2CH_2$ | H | H | $CH_3$ | H | $CH_3$ | H | $CH_3$ | 2 | Oil | |
| 9 | $CH_3S$ | H | H | $CH_3$ | H | $CH_3$ | H | $CH_3$ | 2 | 67–69 | Light petroleum. |
| 10 | $C_2H_5$ | H | H | $CH_3$ | H | $CH_3$ | H | $CH_3$ | 2 | 83–84 | Do. |
| 11 | $CH_3SO_2$ | H | H | $CH_3$ | H | $CH_3$ | H | $CH_3$ | 2 | 110–112 | Benzene-light petroleum. |
| 12 | $CH_3S$ | H | H | $CH_3$ | H | $CH_3$ | $CH_3$ | $CH_3$ | 3 | Oil | |
| 13 | $CH_2=CHCH_2S-$ | H | H | $CH_3$ | H | $CH_3$ | H | $CH_3$ | 2 | Oil | |
| 14 | $CH\equiv CCH_2S-$ | H | H | $CH_3$ | H | $CH_3$ | H | $CH_3$ | 2 | Oil | |

TABLE I—Continued

| Compound Number | R1 | R2 | R3 | R4 | R5 | R6 | R7 | R8 | Method of preparation, Example No. | Melting point, centigrade | Solvent used for crystallization |
|---|---|---|---|---|---|---|---|---|---|---|---|
| 15 | CH3\CSH/CH3 | H | H | CH3 | H | CH3 | H | CH3 | 2 | | Oil |
| 16 | CH3S | H | H | CH3 | CH3 | CH3 | H | CH3 | 2 | 91-93 | Light petroleum. |
| 17 | H | H | H | CH3 | H | CH3 | H | H | 4 | 106 | Benzene-light petroleum. |

The invention also includes the compounds set out below in Table II and corresponding to the general formula:

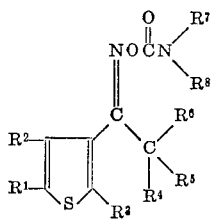

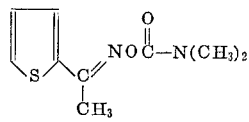

2-thienyl methyl ketone was prepared according to the method given in Organic Syntheses Coll. vol. III p. 14 and then converted to its oxime, which had M.P. 98–99°. To a suspension of sodium hydride (2.7 g., 50% suspension in oil) in anhydrous benzene (90 ml.) was added the

TABLE II

| Compound Number | R1 | R2 | R7 | R8 | R5 | R6 | R4 | R3 | Method | Melting point | Solvent used for crystallisation |
|---|---|---|---|---|---|---|---|---|---|---|---|
| 1 | CH3 | H | H | CH3 | CH3 | H | CH3 | CH3 | 2 | 107 | Benzene-light petroleum. |
| 2 | CH3 | H | H | CH3 | CH3 | CH3 | CH3 | CH3 | 2 | 124-125 | Light petroleum. |

The invention compounds may be prepared by a variety of methods. One convenient method comprises first preparing the intermediate oxime and subsequently carbamoylating it. Thus an appropriately substituted or unsubstituted thiophene may be reacted with an appropriately substituted acid halide or anhydride in the presence of stannic chloride or other Lewis acid (Friedel-Crafts) and the 2-thienyl ketone produced converted to the corresponding oxime by reaction with hydroxylamine. Thereafter O (alkylcarbamoyl) derivatives may be prepared by reacting the oxime with an alkylisocyanate, preferably in the presence of a solvent, for example benzene, and if necessary a catalytic amount of, for example a tertiary amine such as triethylamine. The latter procedure is illustrated in Example 2 below. To prepare O (dialkylcarbamoyl) derivatives, either the sodium salt of the oxime (generated by the treatment of the oxime with sodium hydride) is reacted with a dialkylcarbamoyl halide, or the oxide per se is reacted with a dialkylcarbamoyl halide in the presence of pyridine. Examples 1 and 3 below are, respectively, illustrative of these two alternative procedures.

Other methods may be used to convert the oxime into their corresponding carbamic esters. Thus, for example, the oxime may be reacted with phosgene followed by the appropriate amine.

To prepare a 3-thienyl ketone O (carbamoyl) oxime, a 2,5-dialkylthiophene may be used as the starting substance and reacted with an appropriate acid chloride in the presence of stannic chloride (Friedel-Crafts) thereby effecting an acylation of the 3-position of the thiophene ring.

The invention is illustrated, but not limited, by the following examples.

EXAMPLE 1

This example illustrates the preparation of 2-thienyl methyl ketone O(dimethylcarbamoyl) oxime having the formula:

oxime (7.05 g.) (above) in portions and with stirring. After the addition was complete, the solution was heated under reflux for 15 min., cooled to room temperature, dimethylcarbamoyl chloride (5.4 g.) added, and the mixture heated under reflux for a further 1 hr. After allowing the solution to cool, water (100 ml.) was added and the organic layer separated and dried (MgSO$_4$). Removal of the benzene and crystallisation of the residue from benzene-light petroleum (B.P. 60–80°) afforded the product as colourless needles (6.0 g.), M.P. 104–105°.

Found (percent): C, 50.8; H, 5.45; N, 13.2; S, 15.2. $C_9H_{12}N_2O_2S$ requires (percent): C, 50.95; H, 5.55; N, 13.2; S, 15.1.

EXAMPLE 2

This example illustrates the preparation of 2-thienyl methyl ketone O-(methylcarbamoyl) oxime having the formula:

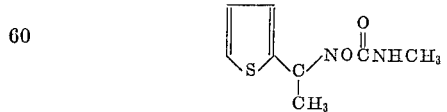

To a mixture of 2-thienyl methyl ketoxime (3.5 g.) and triethylamine (5 drops) in anhydrous benzene (30 ml.) was added methylisocyanate (3 ml.) and the mixture, protected from moisture, then heated under reflux for 1 hr. Removal of the benzene and crystallisation of the residue from benzene light petroleum (B.P. 60–80°) gave the product as colourless needles (4.0 g.), M.P. 85–86°.

Found (percent): C, 48.0; H, 4.9; N, 14.0; S, 15.8. $C_8H_{10}N_2O_2S$ requires (percent): C, 48.4; H, 5.05; N, 14.15; S, 16.15.

EXAMPLE 3

This example illustrates the preparation of isopropyl-5-methylthio-2-thienylketone O-(dimethylcarbamoyl) oxime having the formula:

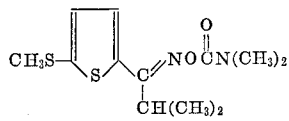

A mixture of isopropyl-5-methylthio-2-thienylketone oxime (1.32 g.) dimethylcarbamoyl chloride (0.62 g.) and anhydrous pyridine (5 ml.) protected from moisture, was heated on a steam bath for 2 hours. The solution was cooled, poured into water (100 ml.) extracted from ether (50 ml.) and the ether layer washed two times with water (100 ml.) and dried ($MgSO_4$). Removal of the ether left the product as a very pale yellow viscous oil (1.5 g.) which could not be induced to crystallize.

The infra-red spectrum containing bands at 1750 (S), 1607 (M), 1150 (S), 1006 (M) and 920 (M) cm.$^{-1}$ (S=strong and M=medium intensity) demonstrates the presence of the compound having the structure given above.

EXAMPLE 4

This example illustrates the preparation of isopropyl-2-thienylketone O-(methylcarbamoyl) oxime having the formula:

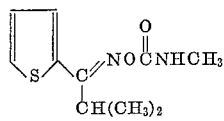

to a solution of phosgene (4.1 g.) in benzene (50 ml.) was added dropwise and with stirring a solution of isopropyl-2-thienylketone oxime (7 g.) and triethylamine (4.2 g.) in benzene (50 ml.). The reaction mixture was kept at less than 10° by cooling in an ice bath and following the addition, was stirred for a further 2 hours. The precipitated triethylamine hydrochloride was removed by filtration, and the filtrate containing the crude oxime chloroformate added with stirring at 10° to an aqueous solution of methylamine (4 g.) in water (20 ml.). Stirring was continued for 30 minutes, when the organic layer was separated, dried ($MgSO_4$) and evaporated. Crystallisation of the residue from benzene-light petroleum gave the product as colourless needles (4.6 g.), M.P. 77–78°.

Found (percent): C, 53.0; H, 6.2; N, 12.7; S, 139. $C_{10}H_{14}N_2O_2S$ requires (percent): C, 53.1; H, 6.2; N, 12.4; S, 4.2.

The compounds of this invention are very toxic towards a variety of insect pests including the following:

*Tetranychus telarius* (red spider mites—adults and eggs)
*Aphis fabae* (black aphids)
*Aedes aegypti* (mosquito larvae)
*Megoura viciae* (green aphids)
*Pieris brassicae* (white butterfly)
*Phaedon cochleariae* (mustard beetle)
*Plutella maculipennis* (caterpillars)
*Musca domestica* (houseflies)
*Meloidogyne incognita* (nematodes)

The following mammalian toxicities of the compounds have been recorded.

| Compound No. Table I: | Oral L.D. 50— rats mg./kg. |
|---|---|
| 9 | 0.5–1.5 |
| 3 | 12–25 |

A particularly useful feature of the activity of the invention compounds is their ability to act as systemic pesticides, that is to say, their ability to move throughout a plant to reach any part thereof and to combat any infestation thereon. Thus a compound of the invention, or a composition containing the same, may be applied to the soil surrounding the roots of a plant and taken up into the plant by its root to combat pests on the plant.

In use, the invention compounds, or compositions containing them, may be applied in a variety of ways. Thus their application can suitably be directed onto the foilage of the plant or to infected and/or infested areas thereof; alternatively the soil surrounding the plant, can be treated with the invention compounds or compositions containing them. If desired the seeds themselves can be similarly treated.

According to a further feature thereof we provide a method of combating undesired pests on plants which comprises applying to the locus of the plant a carbamoyloxime compound or compositions as hereinbefore defined.

In a further aspect the invention provides a method of combating pests on plants which comprises applying to the plants or to seeds thereof a carbamoyloxime compound or composition as hereinbefore defined. The invention further includes a method of treating agricultural soil comprising applying to the soil a carbamoyloxime compound or a composition as hereinbefore defined.

In a yet further aspect the invention includes a method of combating pests which comprises applying to the pests or to a pest habitat a compound or composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, fuller's earth, gypsum Hewitt's earth, diatomaceous earth and China clay. Compositions for dressing seed, for example, may comprise an agent assisting the adhesion of the composition to the seed, for example, a mineral oil.

The compositions may also be in the form of dispersible powder or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethyl ammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butylnaphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethyl-cellulose, and the vegetable gums, for example gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The carbamoyloxime compounds may also be conveniently formulated by admixing them with fertilizers. A preferred composition of this type comprises granules of fertilizer material incorporating, for example coated with, a carbamoyloxime derivative. The fertilizer material may, for example, comprise nitrogen or phosphate-containing substances.

In a yet a further aspect of the invention, therefore, we provide a fertilizer comprising a carbamoyloxime compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 1.0% by weight of active ingredient or ingredients may be used.

It is to be understood that the insecticidal compositions of this invention may comprise, in addition to a carbamoyloxime compound, one or more other compounds having biological activity.

The agricultural compositions of the invention may be stabilised by the incorporation therein of stabilising agents, for example epoxides, for example epichlorohydrin.

The following examples are illustrative of the compositions according to the invention.

EXAMPLE 5

This example illustrates a concentrate comprising a miscible oil which is readily convertible by dilution with water into a liquid preparation suitable for spraying purposes. The concentrate has the following composition:

| | Percent wt. |
|---|---|
| Compound No. 3 of Table I | 25.0 |
| "Lubrol" L (alkylphenol/ethylene oxide condensates; "Lubrol" is a trademark) | 2.5 |
| Calcium dodecylbenzenesulphonate | 2.5 |
| "Aromasol" H (alkylbenzene solvent; "Aromasol" is a trademark) | 70.0 |
| | 100.0 |

EXAMPLE 6

This example also illustrates a concentrate which is in the form of a miscible oil. The composition of this concentrate is as follows:

| | Percent wt. |
|---|---|
| Compound No. 3 of Table I | 25.0 |
| "Lubrol" L ("Lubrol" is a trademark) | 4.0 |
| Calcium dodecylbenzenesulphonate | 6.0 |
| "Aromasol" H ("Aromasol" is a trademark) | 65.0 |
| | 100.0 |

EXAMPLE 7

This example illustrates a wettable powder having the following composition:

| | Percent wt. |
|---|---|
| Compound No. 3 of Table I | 25.0 |
| Sodium silicate | 5.0 |
| Calcium lignosulphonate | 5.0 |
| China clay | 65.0 |
| | 100.0 |

EXAMPLE 8

This example illustrates an atomisable fluid comprising a mixture consisting of 25% by weight of compound No. 3 of Table I and 75% by weight of xylene.

EXAMPLE 9

This example illustrates a dusting powder which may be applied directly to plants or other surfaces and comprises 1% by weight of compound No. 4 of Table I and 99% by weight of talc.

EXAMPLE 10

25 parts by weight of compound No. 3 Table I, 65 parts by weight of xylene, and 10 parts of an alkyl aryl polyether alcohol ("Triton" X–100; "Triton" is a trademark) were mixed in a suitable mixer. There was thus obtained an emulsion concentrate which can be mixed with water to produce an emulsion suitable for use in agricultural applications.

EXAMPLE 11

5 parts by weight of compound No. 3 (Table I) were thoroughly mixed in a suitable mixer with 95 parts by weight of talc. There was thus obtained a dusting powder.

EXAMPLE 12

10 parts by weight of compound No. 3 (Table I) 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 13

This example illustrates a concentrated liquid formulation in the form of an emulsion. The ingredients listed below were mixed together in the stated proportions and the whole stirred until the constituents were dispersed.

| | Percent wt. |
|---|---|
| Compound No. 3 (Table I) | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
| | 100 |

EXAMPLE 14

The ingredients listed below were ground together in the proportions stated to produce a powdered mixture readily dispersible in liquids.

|  | Percent wt. |
|---|---|
| Compound No. 3 (Table I) | 50 |
| Dispersol T [1] ("Dispersol" is a trademark) | 5 |
| China clay | 45 |
|  | 100 |

[1] A mixture of sodium sulphate and a condensate of formaldehyde with the sodium salt of naphthaline sulphonic acid.

EXAMPLE 15

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | Percent wt. |
|---|---|
| Compound No. 9 (Table I) | 50 |
| Dispersol T | 12.5 |
| Calcium lignosulphonate | 5 |
| Sodium dodecylbenzenesulphonate | 12.5 |
| Sodium acetate | 20 |
|  | 100 |

EXAMPLE 16

A composition suitable for use as a seed dressing was prepared by mixing all three of the ingredients set out below in the proportions stated.

|  | Percent wt. |
|---|---|
| Compound No. 9 (Table I) | 80 |
| Mineral oil | 2 |
| China clay | 18 |
|  | 100 |

EXAMPLE 17

A granular composition was prepared by dissolving the active ingredient in a solvent, spraying the solution obtained onto the granules of pumice and allowing the solvent to evaporate.

|  | Percent wt. |
|---|---|
| Compound No. 9 (Table I) | 5 |
| Pumice granules | 95 |
|  | 100 |

EXAMPLE 18

An aqueous dispersion formulation was prepared by mixing and grinding the ingredients recited below in the proportions stated.

|  | Percent wt. |
|---|---|
| Compound No. 4 (Table I) | 40 |
| Calcium lignosulphonate | 10 |
| Water | 50 |
|  | 100 |

The toxicity of a number of the compounds of this invention towards a variety of insect pests was investigated and the tests conducted and results obtained are set out below. The compounds of the invention were in each case used in the form of a liquid preparation containing 0.1% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name of "Lissapol" NX until the liquid preparations contained the required concentration of the compound ("Lissapol" is a trademark).

The test procedure adopted with regard to each test insect was basically the same and comprised supporting a number of the insects on some medium which may be a host plant or some foodstuff on which the insect feeds, and treating either or both the insect and the medium with the preparations. The mortality of the insects was then assessed at periods varying from one to three days after the treatment.

The results of the test are given below in Table I. In this table the first column indicates the compound used. Each of the subsequent columns indicates the name of the test insect, the host plant or medium on which it was supported, and the number of days which were allowed to elapse after treatment before assessing the percentage of insects which had been killed. The assessment is expressed in integers which range from 0 to 3.

0 represents less than 30% kill
1 represents from 30–49% kill
3 represents over 90% kill
2 represents from 50–90% kill The concentration of the invention compound in the solutions used was 1,000 parts per million for all the pests except in the cases of *Aedes aegypti* and *Meloidogyne incognita* when the concentration of the invention compound in the solution used was 10 parts and 100 parts per million, respectively.

TABLE III

| Compound No. | *Tetranychus telarius* (red spider mite), french bean, 3 days | *Tetranychus telarius* (red spider egg), french bean, 3 days | *Aphis fabae* (black aphid), broad bean, 2 days | *Megoura viciae* (green aphid), broad bean, 2 days | *Aedes aegypti* (mosquito larvae), water, 1 day | *Musca domestica* (House flies), milk and sugar, 1 day | *Plutella maculipennis* (Diamond Back moth), mustard/paper, 2 days | *Pieris brassicae* (Cabbage white butterfly), cabbage, 1 day | *Phaedon cochleariae* (Mustard beetle), mustard/paper, 2 days | *Meloidogyne incognita* (Root knot nematode), water, 2 days |
|---|---|---|---|---|---|---|---|---|---|---|
| 1 | 0 |  | 2 | 0 | 0 |  | 0 |  | 0 | 0 |
| 2 | 0 |  | 3 | 3 | 0 | 3 | 3 | 3 | 3 | 3 |
| 3 | 0 |  | 3 | 3 | 3 | 3 | 2 | 3 | 0 | 2 |
| 4 | 0 |  | 3 | 3 | 0 | 3 | 0 | 2 | 0 | 0 |
| 5 | 0 | 2 | 3 | 3 | 0 | 0 | 0 | 0 | 0 | 0 |
| 6 | 0 | 1 | 1 | 2 |  | 2 | 0 | 0 | 0 | 0 |
| 7 | 0 |  | 0 | 0 |  | 3 | 3 | 3 | 3 | 3 |
| 8 | 0 |  | 0 | 0 | 3 | 3 | 3 | 3 | 0 | 0 |
| 9 | 3 | 2 | 3 | 3 | 0 | 0 | 2 | 0 | 3 | 3 |
| 10 | 3 | 0 | 3 | 3 | 0 | 0 | 2 | 0 | 3 | 3 |
| 11 | 1 | 2 | 3 | 3 | 0 | 3 | 0 | 0 | 2 | 2 |
| 12 | 3 | 0 | 3 | 3 | 3 | 2 | 0 | 2 | 2 | 1 |
| 13 | 3 | 0 | 3 | 3 | 3 | 0 | 0 | 0 | 2 | 0 |
| 14 | 0 |  | 3 | 3 | 3 | 1 | 0 | 3 | 0 | 0 |
| 15 | 3 |  | 3 | 3 | 0 | 0 | 0 | 0 | 0 | 0 |
| 16 | 3 |  | 3 | 3 | 0 | 0 | 0 | 0 | 0 | 0 |
| 17 | 0 |  |  |  |  |  |  |  |  |  |

I claim:
1. An insecticidal composition comprising as an active ingredient an insecticidally effective amount of from about 0.0001% to about 85% by weight of a carbamoyloxime having the formula:

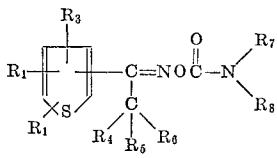

wherein
$R_1$, $R_2$ and $R_3$ represent hydrogen, lower alkyl, lower alkylthio, lower alkenylthio, lower alkynylthio or lower alkyl sulphonyl;
$R_4$, $R_5$, $R_6$, $R_7$ and $R_8$ represent hydrogen or lower alkyl, and the oxime-containing moiety is attached to the carbon atom occupying the 2-, or 3-position of the thiophene ring, and an agricultural or horticultural acceptable carrier.

2. An insecticidal composition according to claim 1 wherein $R_1$ represents lower alkyl, lower alkylthio, lower alkenylthio, lower alkynylthio or lower alkylsulphonyl, $R_2$ and $R_3$ represent hydrogen; $R_4$, $R_5$, $R_6$, $R_7$ and $R_8$ represent hydrogen or lower alkyl; and the oxime-containing moiety is attached to the carbon atom occupying the 2- position of the thiophene ring.

3. An insecticidal composition according to claim 1 having as an active ingredient a member selected from the group consisting of compounds having the structural formulae:

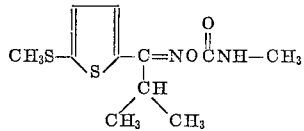

and

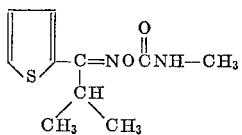

4. An insecticidal composition according to claim 1 wherein the carrier comprises a wetting, dispersing, suspending or emulsifying agent.

5. An insecticidal composition according to claim 1 wherein the carrier is a solid carrier.

6. An insecticidal composition according to claim 5 wherein the solid carrier is a powder or granule.

7. A method of combatting insect infestations which comprises applying an insecticidally effective amount of the composition of claim 1 to the insect or the insect habitat.

8. The method of claim 7 wherein the composition is applied to the insect habitat.

9. The method of claim 7 wherein the composition is applied to the insect.

10. The method of claim 7 wherein the composition is applied to the locus of a plant or seeds.

11. The method of claim 10 wherein the composition is applied to seeds.

12. The method of claim 10 wherein the composition is applied to the soil in which the plants or seeds are to be placed.

References Cited
UNITED STATES PATENTS 3,060,177  10/1962  Druey et al. _____ 260—240
3,483,231  12/1969  Marcus et al. _____ 260—396

JEROME D. GOLDBERG, Primary Examiner

A. J. ROBINSON, Assistant Examiner

U.S. Cl. X.R.

260—332.2